US008145022B2

(12) United States Patent
Overton et al.

(10) Patent No.: US 8,145,022 B2
(45) Date of Patent: *Mar. 27, 2012

(54) OPTICAL-FIBER CABLE HAVING OPTICAL FIBERS ADHESIVELY COUPLED TO WATER-SWELLABLE ELEMENT

(75) Inventors: Bob J. Overton, Lenoir, NC (US); Wayne Cheatle, Hickory, NC (US); Greg DeChristopher, Hickory, NC (US)

(73) Assignee: Draka Comteq, B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/011,976

(22) Filed: Jan. 24, 2011

(65) Prior Publication Data

US 2011/0116753 A1    May 19, 2011

Related U.S. Application Data

(63) Continuation of application No. 12/506,533, filed on Jul. 21, 2009, which is a continuation of application No. 12/023,386, filed on Jan. 31, 2008, now Pat. No. 7,567,739, said application No. 12/506,533 is a continuation-in-part of application No. 12/018,604, filed on Jan. 23, 2008, now Pat. No. 7,599,589, and a continuation-in-part of application No. 11/424,112, filed on Jun. 14, 2006, now Pat. No. 7,515,795.

(60) Provisional application No. 60/887,373, filed on Jan. 31, 2007, provisional application No. 60/886,235, filed on Jan. 23, 2007, provisional application No. 60/764,776, filed on Feb. 3, 2006, provisional application No. 60/710,654, filed on Aug. 24, 2005, provisional application No. 60/700,739, filed on Jul. 20, 2005.

(51) Int. Cl.
*G02B 6/44* (2006.01)
(52) U.S. Cl. .................................................. 385/111
(58) Field of Classification Search .................. 385/111
See application file for complete search history.

(56) References Cited

U.S. PATENT DOCUMENTS

| 4,113,349 A | 9/1978 | Stiles |
| 4,211,591 A | 7/1980 | Stiles |
| 4,232,935 A | 11/1980 | Rohner et al. |
| 4,239,335 A | 12/1980 | Stiles |
| 4,366,206 A | 12/1982 | Tanaka |
| 4,600,407 A | 7/1986 | Huber |
| 4,703,998 A | 11/1987 | Uchioke et al. |
| 4,873,143 A | 10/1989 | Tanaka |
| 4,909,592 A | 3/1990 | Arroyo et al. |

(Continued)

FOREIGN PATENT DOCUMENTS

EP    0373846 A2    6/1990

(Continued)

OTHER PUBLICATIONS

European Search Report in counterpart European Application No. 06014897, dated Mar. 9, 2007.

(Continued)

*Primary Examiner* — Charlie Peng
(74) *Attorney, Agent, or Firm* — Summa, Additon & Ashe, P.A.

(57) ABSTRACT

An optical-fiber cable includes an adhesive material that adhesively couples a water-swellable element to a plurality of optical fibers.

21 Claims, 4 Drawing Sheets

U.S. PATENT DOCUMENTS

| | | | |
|---|---|---|---|
| 5,109,457 A | 4/1992 | Panuska et al. | |
| 5,138,685 A * | 8/1992 | Arroyo et al. | 385/113 |
| 5,264,251 A | 11/1993 | Geursen et al. | |
| 5,369,720 A * | 11/1994 | Parry et al. | 385/114 |
| 5,630,003 A | 5/1997 | Arroyo | |
| 5,906,952 A | 5/1999 | Everaere et al. | |
| 5,925,461 A | 7/1999 | Fairgrieve | |
| 6,003,565 A * | 12/1999 | Whittier et al. | 139/420 A |
| 6,151,434 A | 11/2000 | Bonicel | |
| 6,167,179 A * | 12/2000 | Weiss et al. | 385/103 |
| 6,167,180 A * | 12/2000 | Keller | 385/113 |
| 6,178,278 B1 | 1/2001 | Keller et al. | |
| 6,226,431 B1 | 5/2001 | Brown et al. | |
| 6,253,012 B1 | 6/2001 | Keller et al. | |
| 6,278,826 B1 | 8/2001 | Sheu | |
| 6,284,367 B1 | 9/2001 | Gruhn et al. | |
| 6,321,012 B1 | 11/2001 | Shen | |
| 6,374,023 B1 | 4/2002 | Parris | |
| 6,463,199 B1 | 10/2002 | Quinn et al. | |
| 6,504,979 B1 | 1/2003 | Norris et al. | |
| 6,504,980 B1 | 1/2003 | Gallard et al. | |
| 6,574,400 B1 * | 6/2003 | Lail | 385/109 |
| 6,631,229 B1 | 10/2003 | Norris et al. | |
| 6,633,709 B2 | 10/2003 | Van Vickle et al. | |
| 6,654,526 B2 | 11/2003 | Nechitailo et al. | |
| 6,748,146 B2 | 6/2004 | Parris | |
| 6,749,446 B2 | 6/2004 | Nechitailo | |
| 6,757,465 B1 | 6/2004 | Yokokawa et al. | |
| 6,760,523 B2 | 7/2004 | Nechitailo | |
| 6,778,745 B2 | 8/2004 | Debban, Jr. et al. | |
| 6,847,768 B2 | 1/2005 | Lail et al. | |
| 6,899,776 B2 | 5/2005 | Bahlmann et al. | |
| 6,934,452 B2 | 8/2005 | Bocanegra et al. | |
| 6,970,629 B2 | 11/2005 | Lail et al. | |
| 7,006,740 B1 | 2/2006 | Parris | |
| 7,171,086 B2 | 1/2007 | Engel | |
| 7,177,507 B2 | 2/2007 | Parsons et al. | |
| 7,231,119 B2 | 6/2007 | Rhoney et al. | |
| 7,236,670 B2 | 6/2007 | Lail et al. | |
| 7,254,302 B2 | 8/2007 | Parsons et al. | |
| 7,254,303 B2 | 8/2007 | Parsons | |
| 7,277,615 B2 | 10/2007 | Greenwood et al. | |
| 7,336,873 B2 | 2/2008 | Lail et al. | |
| 7,349,607 B2 | 3/2008 | Schneider et al. | |
| 7,397,992 B1 | 7/2008 | Blazer et al. | |
| 7,471,861 B2 | 12/2008 | Schneider et al. | |
| 7,515,795 B2 | 4/2009 | Overton et al. | |
| 7,567,739 B2 | 7/2009 | Overton et al. | |
| 7,599,589 B2 | 10/2009 | Overton et al. | |
| 7,630,605 B2 | 12/2009 | Bringuier et al. | |
| 7,693,375 B2 * | 4/2010 | Freeland et al. | 385/100 |
| 2002/0154873 A1 | 10/2002 | Sheu | |
| 2003/0108310 A1 * | 6/2003 | Nechitailo et al. | 385/109 |
| 2003/0118301 A1 * | 6/2003 | Hurley et al. | 385/114 |
| 2004/0120663 A1 * | 6/2004 | Lail et al. | 385/100 |
| 2005/0180704 A1 | 8/2005 | Terry et al. | |
| 2005/0213902 A1 | 9/2005 | Parsons | |
| 2006/0165355 A1 * | 7/2006 | Greenwood et al. | 385/100 |
| 2007/0019915 A1 * | 1/2007 | Overton et al. | 385/100 |
| 2007/0297730 A1 | 12/2007 | Bringuier et al. | |
| 2008/0056649 A1 | 3/2008 | Fulbright et al. | |
| 2008/0145010 A1 | 6/2008 | Overton et al. | |
| 2008/0181564 A1 * | 7/2008 | Overton et al. | 385/109 |
| 2009/0279833 A1 | 11/2009 | Overton et al. | |

FOREIGN PATENT DOCUMENTS

| | | |
|---|---|---|
| EP | 0482703 A1 | 4/1992 |
| EP | 1298477 A2 | 9/2001 |
| EP | 1746447 A2 | 1/2007 |
| EP | 1746447 A2 | 2/2007 |
| EP | 01818704 A2 | 8/2007 |

OTHER PUBLICATIONS

U.S. Appl. No. 60/700,739, filed Jul. 20, 2005 [Parent of present application].
U.S. Appl. No. 60/710,654, filed Aug. 24, 2005 [Parent of present application].
U.S. Appl. No. 60/764,776, filed Feb. 3, 2006 [Parent of present application].
European Office Action in counterpart European Application No. 06014897, dated Oct. 30, 2008.
Office Action in counterpart European Application No. 06014897, dated Oct. 30, 2008.
Commonly owned U.S. Appl. No. 60/887,373, filed Jan. 31, 2007.
Commonly owned U.S. Appl. No. 60/886,235, filed Jan. 23, 2007.
Bluestar Silicones, "Silbione RTV-4410 A?B," product data sheet, www.bluestarsilicones.com, (Jun. 2007) pp. 1-2.
Verizon, "Verizon NEBS Compliance: Optical Fiber and Optical Fiber Cable," VZ.TPR.9430, Issue 4, (Apr. 2010) pp. 1-29.

* cited by examiner

OPTICAL-FIBER CABLE HAVING OPTICAL FIBERS ADHESIVELY COUPLED TO WATER-SWELLABLE ELEMENT

CROSS-REFERENCES TO PRIORITY APPLICATIONS

The present application is a continuation of commonly assigned U.S. application Ser. No. 12/506,533 for a Buffer Tube with Adhesively Coupled Optical Fibers and/or Water Swellable Element, filed Jul. 21, 2009 (and published Nov. 12, 2009), as U.S. Patent Application Publication No. 2009/0279833 A1.

Parent U.S. application Ser. No. 12/506,533 is a continuation of commonly assigned U.S. application Ser. No. 12/023,386 for Fiber Optic Cable Having Water-Swellable Element, filed Jan. 31, 2008 (and published Jul. 31, 2008, as U.S. Patent Application Publication No. 2008/0181564 A1), now U.S. Pat. No. 7,567,739, which claims the benefit of U.S. Provisional Application No. 60/887,373 for Fiber Optic Cable Having Powder-Free Water-Swellable Tape, filed Jan. 31, 2007.

Parent U.S. application Ser. No. 12/506,533 is also a continuation-in-part of commonly assigned U.S. application Ser. No. 12/018,604 for a Gel-Free Buffer Tube with Adhesively Coupled Optical Element, filed Jan. 23, 2008 (and published Jun. 19, 2008, as U.S. Patent Application Publication No. 2008/0145010 A1), now U.S. Pat. No. 7,599,589, which itself claims the benefit of U.S. Provisional Application No. 60/886,235 for a Gel-Free Buffer Tube with Adhesively Coupled Optical Element, filed Jan. 23, 2007.

Parent U.S. application Ser. No. 12/018,604 is a continuation-in-part of U.S. application Ser. No. 11/424,112 for Water-Swellable Tape, Adhesive-Backed for Coupling When Used Inside a Buffer Tube, filed Jun. 14, 2006 (and published Jan. 25, 2007, as U.S. Patent Application Publication No. 2007/0019915 A1), now U.S. Pat. No. 7,515,795, which itself claims the benefit of the following commonly-assigned, provisional patent applications: U.S. Provisional Application No. 60/700,739 for Method to Provide Waterblocking to Optical Fiber Cable Components, filed Jul. 20, 2005; U.S. Provisional Application No. 60/710,654 for Method to Provide Waterblocking to Optical Fiber Cable Components, filed Aug. 24, 2005; and U.S. Provisional Application No. 60/764,776 for Water-Swellable Tape, Adhesive-Backed for Coupling When Used Inside a Buffer Tube, filed Feb. 3, 2006.

Each of the foregoing patents, patent application publications, and patent applications is hereby incorporated by reference in its entirety.

FIELD OF THE INVENTION

The present invention relates to a cable that includes a water-swellable tape or yarn that is used for water-blocking inside a buffer tube and that further includes an adhesive material for bonding the tape or yarn to the optical fibers and/or the buffer tube.

BACKGROUND

Water-blocking, petroleum-based filling gel in optical fiber buffer tubes and cable serves two purposes. First, by completely filling all of the free space inside a buffer tube containing an optical fiber or fiber bundle, the filling gel blocks the ingress of water into the cable. Second, being a thixotropic material, the filling gel mechanically couples the optical fiber or fiber bundle to the buffer tube and prevents the optical fiber or fiber bundle from pulling back inside the buffer tube as the buffer tube is processed, as the cable is installed or otherwise handled, or as the cable is subjected to thermally induced dimensional changes due to environmental exposure. A totally dry cable eliminates the filling gel from inside a buffer tube, whether loose tube fiber or ribbon cable. In a totally dry cable, filling gel may be replaced by a water-swellable element, which may be a tape or a yarn carrying a water-swellable material. The water-swellable element, however, may not provide for sufficient coupling of the optical fiber or ribbon to the buffer tube, thus allowing the optical fiber or ribbon to pull back inside the tube/cable when the cable is installed or exposed to temperature extremes.

U.S. Pat. No. 6,970,629 and U.S. Patent Application Publication No. 2005/0213902 A1 disclose adhesively attaching a water-swellable element (or dry insert) to a buffer tube. Although this may assist in preventing the optical fibers or ribbons from retracting with respect to the buffer tube, it introduces its own problem in the manufacturing of the cable. More specifically, it is preferable that the water-swellable element have the ability to move with respect to the buffer tube prior to and during cooling of the buffer tube, so that the optical fibers or ribbons do not experience a column-like bending when the buffer tube contracts during the cooling. Such bending of the optical fibers or ribbons may result in optical signal losses because the optical fibers or ribbons may touch the inside wall of the buffer tube.

Indeed, it is common to tension the optical fibers or ribbons to induce a positive strain during the buffer-tube-extrusion process. In this manner, when the buffer tube material contracts on cooling, the positive strain in the optical fibers or ribbons compensates for some of the buffer tube contraction before the optical fibers or ribbons begin to absorb the contraction by the column-like bending.

SUMMARY OF THE INVENTION

In one aspect, the invention embraces a buffer tube arrangement that includes a plurality of optical fibers; a buffer tube enclosing the optical fibers; a water-swellable element (e.g., tape or yarn) disposed between the optical fibers and the buffer tube; and a curable (e.g., a chemically cross-linking) adhesive material provided on the water-swellable element for bonding the water-swellable element to the buffer tube. The curable adhesive material may be, for example, a thermally curable material, such as a two-component silicone or a radiation-curable material (e.g., a silicone acrylate cross-linked by exposure to actinic radiation).

The optical fibers may be, for example, formed into ribbons having between two and 24 or more optical fibers held together in a planar configuration by the application of a thin overcoat, or matrix, of UV curable material. Thus, in the buffer tube, optical fibers may be bundled as a ribbon stack, or they may be individually helically wound around each other. Alternatively, the optical fibers may be loosely disposed.

In another aspect, the buffer tube arrangement can include an additional adhesive material that bonds or otherwise couples the optical fibers to the water-swellable material (e.g., a water-swellable tape or yarn).

The foregoing, as well as other objectives and advantages of the invention and the manner in which the same are accomplished, is further specified within the following detailed description and its accompanying, non-limiting drawings.

DETAILED DESCRIPTION OF THE INVENTION

Figure 1:
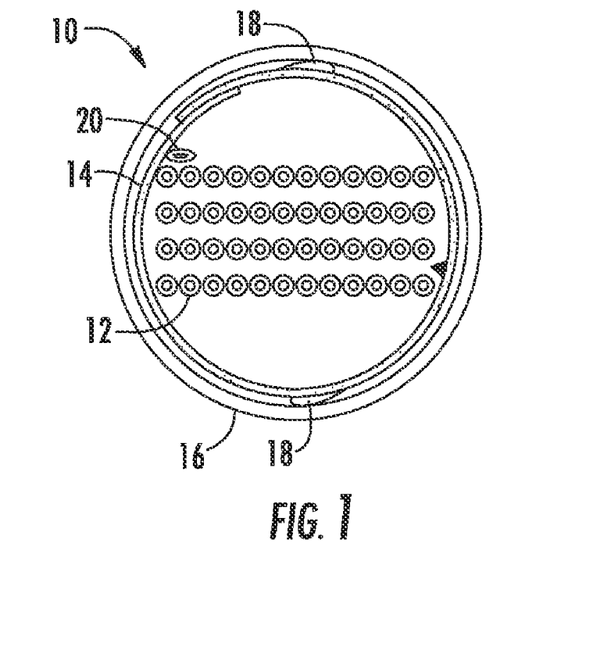
FIG. 1 is a sectional view of an embodiment of a first aspect of the cables.

FIG. 1 illustrates an embodiment of a first aspect of the cables, wherein a buffer tube arrangement 10 includes a plurality of optical fibers 12 arranged in a bundle, a water-swellable element 14 disposed around the bundle of optical fibers 12, a buffer tube 16 in which the optical fibers 12 and water-swellable element 14 are enclosed, a curable adhesive material 18 for bonding the water-swellable element to the buffer tube, and an adhesive material 20 for bonding the optical fiber bundle 12 to the water-swellable element 14.

As previously noted, although FIG. 1 illustrates the optical fibers bundled together as a ribbon stack, the optical fibers, alternatively, may be loosely disposed or helically wound around each other, for example.

The water-swellable element 14 may include a water-swellable tape or water-swellable yarn that carries or contains a water-swellable powder. The water-swellable powder may be applied to both sides of the water-swellable element, or it may be applied to only one side. In certain embodiments, water-swellable element 14 may include two layers, and the water-swellable powder may be applied between the two layers sandwiched together.

The composition of the water-swellable tape or yarn is not particularly limited. An example tape or yarn may be made of a material which includes a polyester, such as, for example, an inexpensive, strong and lightweight polyester carrier material within which particles or coatings of sodium polyacrylate (i.e., an exemplary superabsorbent polymer or SAP) are affixed. Exemplary tapes may also be spun-bonded filaments of polyester, although other materials are sometimes used (e.g., polypropylene). Other examples of water-swellable tapes that can be used in the cables according to the present invention are disclosed in U.S. Pat. Nos. 4,909,592, 6,284,367, 6,899,776, and 7,231,119. Examples of water-swellable yarns, including a plurality (e.g., four) of 1500-denier water-swellable yarns, that can be used in the cables according to the present invention are disclosed in U.S. Pat. Nos. 4,703,998, 6,633,709, and 6,654,526. Each of the foregoing patents is hereby incorporated by reference in its entirety.

The composition of buffer tube 16 is also not particularly limited and may include, for example, polypropylene, polyethylene, or polybutylene terephthalate.

The compositions of buffer tube 16 and water-swellable element 14 may be such that the two do not sufficiently bond together through normal bonding mechanisms, such as, for example, melt-bonding (diffusion mechanism), Van der Waal's forces or hydrogen bonding (electrostatic mechanisms), surface energy interactions, and other electrostatic mechanisms. This may be the case when, for example, a polyester-based water-swellable element 14 is used together with a polypropylene buffer tube 16.

Depending on the materials chosen for the compositions of buffer tube 16 and water-swellable element 14, a slight amount of mechanical coupling between buffer tube 16 and water-swellable element 14 may occur due to fibrils of the water-swellable element 14 becoming embedded in the inner wall of the buffer tube 16. This may occur, for example, during cooling of the buffer tube 16. This kind of mechanical coupling may be minimized or maximized by design, and if minimized, may be insufficient to ensure adequate coupling forces between the optical fibers 12 and the buffer tube 16. For example, if, during installation the cable is overly jostled or otherwise roughed up, a polyester-based water-swellable element, which merely has its fibers embedded in the inner wall of a polypropylene buffer tube 16, may separate from the buffer tube 16.

Thus, using a water-swellable tape or water-swellable yarn to water-block inside a buffer tube 16 may significantly reduce coupling forces between the optical fiber bundle 12 (e.g., optical fiber ribbons) and the buffer tube 16, by relying mainly on friction between the optical fiber bundle 12, the tape or yarn (i.e., the water-swellable element 14), and the buffer tube 16.

Figure 2:
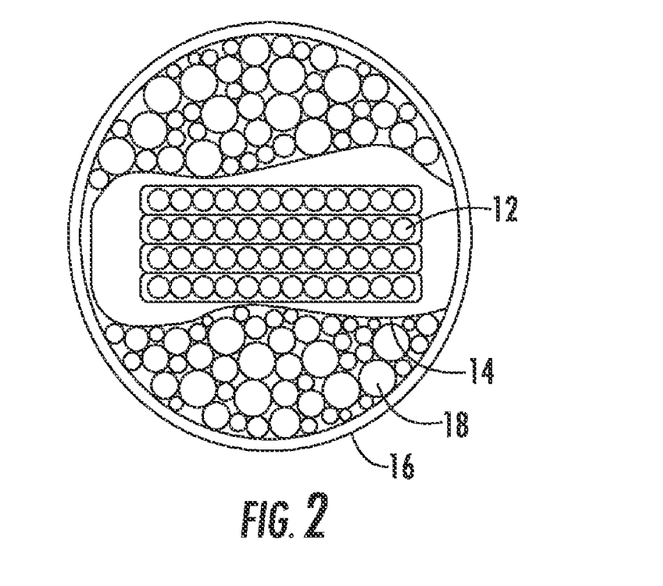
FIG. 2 is a sectional view of another embodiment of a first aspect of the cables.

Therefore, a curable adhesive material 18 may be provided on the surface of or embedded in the water-swellable tape or water-swellable yarn to bond, upon curing, the water-swellable element 14 to the buffer tube 16. The curable adhesive material 18, for example, may be a thermally-curable material or a radiation-curable material and can be applied in an unfoamed state as shown in FIG. 1 or a foamed state as shown in FIG. 2. Although an adhesive material 20 for bonding the optical fiber bundle 12 to the water-swellable element 14 is not illustrated in FIG. 2, embodiments of the first aspect of the cables wherein curable adhesive material 18 is in a foamed state may also include such an adhesive material 20.

Foaming may reduce stress on components of the cable, including the optical fibers 12, by allowing the buffer-tube-extrusion process to push the foamed curable adhesive thoroughly around the water-swellable element 14 without deformation of the buffer tube 16. Also, the linear stresses which can build in the optical fibers 12 (e.g., the ribbon) due to temperature changes and differential thermal contraction between the curable adhesive material and the ribbons, are reduced because of the foam structure. A foamed curable adhesive material may be closed-cell in nature.

Application of curable adhesive material 18 in a foamed state may effectively block water between water-swellable element 14 and the buffer tube wall, while the water-swellable element 14 may effectively block the interstice between itself and the ribbons.

An example of a thermally curing material which may be used as curable adhesive material 18 is a two-part, room temperature vulcanizing (RTV) silicone, such as GE RTV615, which may be foamed before application in the buffer tube. Another example is a RTV silicone that is self-foaming a few seconds after application, such as, for example, Dow Corning's 3-8159 RF silicone foam. Another example is a two-part urethane, which also may be foamed during mixing or which can be formulated to self-foam during the curing process. Examples of the latter are Reoflex urethane rubbers sold by Smooth-On Corp. These kinds of materials can also be formulated with a very low modulus that does not change substantially with temperature excursions normally encountered in the environments in which optical fiber cables may be deployed.

Examples of radiation-curable materials include Shin-Etsu's OF212 and OF207 radiation-curable silicone acrylates, and DSM Desotech's 3471-1-135 radiation-curable urethane acrylate. Such materials are fast-curing with applied actinic radiation and typically possess low Young's modulus to minimize stress on the optical fibers or fiber bundles.

The method for applying the curable adhesive material 18 is not particularly limited. For example, curable adhesive material 18 may be applied as a continuous bead or an intermittent bead. Also, a plurality of beads may be applied (e.g., two beads, intermittent or continuous, a certain number of degrees apart, such as 180°).

The curable adhesive material 18 may be applied, for example, to the outside of the wrapped water-swellable element 14 (i.e., containing the optical fibers 12 or ribbon stack on the inside) just before entering the extruder for the buffer tube. The curable adhesive material 18 may still be liquid for the rest of the buffer-tube-application process, allowing the water swellable element 14 and the optical fibers 12 to remain together in sync (i.e., moving at the same rate) all the way to the take-up reel.

After the buffer-tube-application, the curable adhesive material 18 may be completely cured, forming a bond between the buffer tube 16 and the water-swellable element 14 wrapped around the optical fibers 12. For example, curing of adhesive material 18 may be designed to take place after the buffer tube 16 has cooled to a predetermined degree or at a predetermined time after extruding the buffer tube 16.

The application arrangement of curable adhesive 18 may be adjusted to provide the degree of bonding required. In this regard, the adhesive bond provided by curable adhesive 18 preferably should be such that it is possible to cut the buffer tube 16 near an end and pull it off over the water-swellable element 14 with relative ease. On the other hand, the bonding provided by curable adhesive 18 preferably should provide for coupling of the water-swellable element 14 to the buffer tube 16 for successful handling/installation of the cable without the optical fibers 12 or ribbons in the buffer tube 16 retracting within the cable.

An advantage of using a curable adhesive material is that a tension can be applied to both the water-swellable material 14 and the optical fibers 12 during the buffering process, providing the water-swellable material 14 the ability to move with respect to the buffer tube 16 prior to the curing of the adhesive material.

As noted, the ability to subject the optical fibers and water-swellable material to tension is beneficial in certain manufacturing methods. More specifically, it may be necessary to limit the excess length of the optical fibers inside the buffer tube in order to minimize optical signal losses caused by contact stresses between the optical fibers and the inside wall of the buffer tube. The excess length is generated when the thermoplastic buffer tube contracts linearly during post-extrusion cooling because the optical fibers do not contract. To limit the excess length, it is common to tension the optical fibers at payoff and the fiber-containing buffer tube after the coupling point to induce a positive strain during the buffer-tube-extrusion process. Then, when the buffer tube material contracts on cooling, the positive strain in the optical fibers compensates for some of the buffer tube contraction before the optical fibers begin to absorb the contraction by controlled buckling. The water-swellable element 14 can also be subjected to a strain to prevent wrinkling or bunching of the water-swellable element 14 when the buffer tube contracts on cooling.

The buffer tube arrangements described herein may allow for the elimination of the filling gel and yet still provide a desirable coupling profile between the water-swellable element and the buffer tube. The buffer tube arrangements can also employ cured adhesion, rather than friction, to guarantee coupling even in short sections of cable. The efficacy of the friction approach is questionable. The achievement of sufficient frictional force between the contents of the buffer tube and the buffer tube wall may be detrimental to the optical performance of the optical fibers.

An adhesive material 20 may be used to bond the optical fiber bundle 12 to the water-swellable element 14. For example, the adhesive material 20 may be applied during the buffer tube application process as a single bead or a plurality of beads from a fixed head positioned directly over the optical fibers between the die controlling the positioning of the optical fibers and the water-swellable element applicator. In other embodiments, adhesive material 20 may be embedded in water-swellable element 14 in a manner that will permit it to bond the water-swellable element 14 to the optical fibers.

The die here may be an apparatus that positions the optical fibers (e.g., arranges all the ribbons together into a stack). The die and ribbon payoffs may be in a "tree" that rotates while everything else is fixed. Thus, the ribbon stack may be twisted helically as it is fed into the buffer tube extruder head. Accordingly, a bead of adhesive material 20, in effect, may spiral around the ribbon stack, passing over the corners and over each side of the stack before the water-swellable tape is applied. Alternatively, the bead applicator may be mounted on a rotating fixture such that the bead or beads may be applied only onto the corners of the ribbon stack, or onto the top and bottom of the ribbon stack, or only onto the sides of the ribbon stack.

The particular application arrangement of adhesive material 20 is not intended to be limited to a single bead. For example, two beads positioned a certain number of degrees apart, such as, for example, 180° apart, may be applied to help keep the stack better centered and well-cushioned against contact with the water-swellable element and buffer tube wall and to maintain stack integrity. The adhesive material 20 may also be applied as a film directly onto the water-swellable tape before it is wrapped around the ribbon stack. Other shapes and numbers of adhesive beads may be utilized as well. In every case, the intention is to couple the ribbon stack to the water-swellable tape through the use of the adhesive.

Advantageously, the adhesive may be foamed (e.g., silicone foam) to further reduce the modulus of the material. The degree of foaming, measured by percent reduction in adhesive density from the fully non-foamed state, may be, for example, from one percent to 95 percent. More preferably, the degree of foaming may be 20 percent to 80 percent. Most preferably, the degree of foaming may be from 40 percent to 60 percent. The foamed adhesive material may fill from one percent to virtually 100 percent of the free space inside the water-swellable element, more preferably from one percent to 50 percent of the free space, most preferably from 1 percent to 20 percent of the free space.

In another embodiment, the foam may be applied as small discrete domains of the adhesive material 20, such as silicone foam, sputtered onto water-swellable element 14. In yet another embodiment, the foam may be applied as small, discrete domains of the adhesive material 20 sputtered onto the optical fiber bundle 12 (e.g., a ribbon stack of optical fibers). Under either embodiment, the minutely localized application of the adhesive foam may be generated, for example, by the addition of gas from an external source, by a chemical reaction internal to the material, or by the addition of material that expands due to heat. By way of specific example, the adhesive material 20 may be dispersed onto the optical elements using a high velocity gas.

Such techniques, which will be understood by those having ordinary skill in the art, can achieve small dots (i.e., discrete domains) of adhesive foam that can provide satisfactory adhesive coupling of the water-swellable element 14 and the optical fiber bundle 12. For instance, dots of adhesive material (e.g., having diameters averaging less than one millimeter or so) may be, on a relative basis, widely dispersed (e.g., spaced more than about one millimeter from adjacent dots of adhesive material). Those having ordinary skill in the art will understand that the application of adhesive material 20 should be sufficient to develop the desired adhesive coupling between the water-swellable element 14 and the optical fiber bundle 12 (i.e., less adhesive material and wider dispersion yields a relatively weaker bond). According to this aspect of the invention, adhesive bonding typically provides the predominant coupling force between the water-swellable element 14 and the optical fiber bundle 12.

As with other application methods, the particular application of the adhesive material 20 is not intended to be limited to a single method. The foamed adhesive material 20 may be applied (e.g., sprayed) to the optical fiber bundle 12 and/or the water-swellable element 14 in one or more controlled streams. This can regularly distribute the adhesive material 20 over all or part of the optical fiber bundle 12 and/or the water-swellable element 14 to achieve, for instance, a pattern of discontinuously spaced adhesive material 20. Alternatively, the foamed adhesive material 20 may be applied less systematically to the optical fiber bundle 12 and/or the water-swellable element 14 thereby yielding a more random, discontinuous application of adhesive material 20.

The step of applying adhesive material may be performed at various times during the fabrication process. The adhesive material may be applied (e.g., sputtered) onto the water-swellable tape or the ribbon stacks well before the water-swellable tape and the ribbon stack are coupled. More typically, the adhesive material is applied to the water-swellable tape (or to the ribbon stack) as the water-swellable tape is formed around the ribbon stack. Preferably, the discontinuous adhesive material is integrated to the water-swellable element 14 so that, during the application of the buffer layer (e.g., extrusion of the buffer tube 16), shearing forces between the optical fiber bundle 12 and the water-swellable element 14 will not remove the adhesive material 20. Of course, any application method is acceptable provided the adhesive functions to couple the optical fiber bundle 12 (e.g., the ribbon stack) and the water-swellable element 14 (e.g., the water-swellable tape).

One advantage of employing discrete domains of the adhesive material (e.g., discontinuous foam dots) is that it provides adequate coupling of the optical fiber bundle 12 and the water-swellable element 14 yet minimizes physical contact with the optical elements. In other words, it is thought that reducing the surface area of the adhesive material that contacts the optical elements will reduce the potential for microbending.

The composition of adhesive material is not particularly limited. It may include a hot melt adhesive, such as, for example, an ethylene-vinyl acetate, an ethylene-butyl acetate, or an ethylene-ethyl acetate, or it may include styrene-butadiene block copolymer blends with oils, thermoplastic urethane, a thermoset urethane or other thermoset composition, or a polyvinyl butyral. Adhesive material 20 may even include a polypropylene or another polyolefin.

For example, adhesive material 20 may include a block copolymer of styrene end-blocks with a butylene or an ethylene-butylene mid-block. The styrene end-blocks on the molecules may associate as the rubber in the blend cools, forming pseudo-crosslinks and giving the blend the characteristics of a cross-linked solid while remaining soft through a broad temperature range. An example of such an adhesive is MA-145 sold by Master Adhesive.

Adhesive material 20 may also be a curing material, such as, for example, any of the radiation-curable materials or thermally curing materials discussed herein with respect to curable adhesive material 18.

According to the first aspect of the cables, a curable adhesive material 18 and adhesive material 20 are used to bond the water-swellable element 14 to the buffer tube 16 and the optical fiber bundle 12 to the water-swellable element 14, respectively. However, the cables are not limited to this particular aspect.

Figure 3:
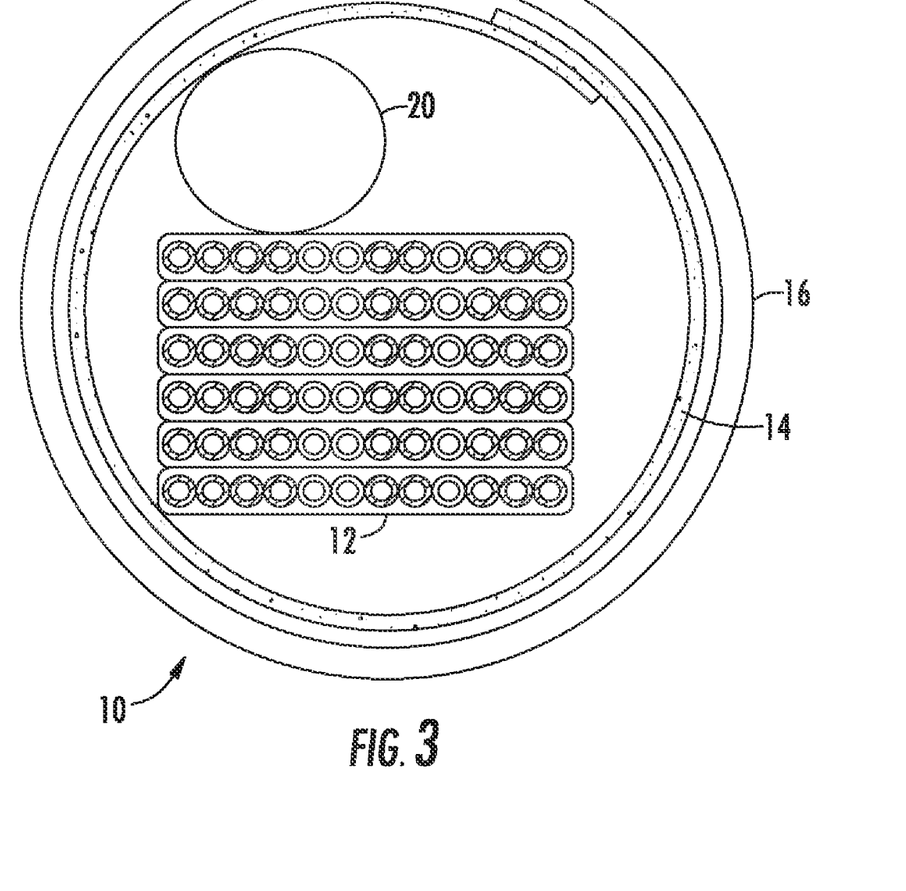
FIG. 3 is a sectional view of an embodiment of a second aspect of the cables.

For example, according to a second aspect of the cables, an embodiment of which is shown in FIG. 3, cables may be provided in which the water-swellable element 14 is adhered to the buffer tube 16, either by friction or by mechanically coupling the buffer tube 16 directly to the water-swellable element 14.

In this second aspect, the compositions of buffer tube 16 and water-swellable element 14 may be chosen to promote the coupling of the water-swellable element 14 to a wall of buffer tube 16 through the mechanical interlocking of fibers embedding into the tube wall. Fibrils of the water-swellable element 14 may become embedded in the inner wall of the buffer tube 16, for example, during cooling of the extruded buffer tube. In an embodiment of this second aspect of the cables, the water-swellable element 14 may be made of a material including, for example, polyester fibers and the buffer tube 16 may be made of a material including polyethylene.

According to the second aspect of the cables, the cables include an adhesive material 20 for bonding the optical fibers to the water-swellable material. Adhesive material 20 may be any of the adhesive materials 20 previously identified in connection with FIG. 1.

On the other hand, the cables do not require the presence of the adhesive material 20 for bonding the optical fibers to the water-swellable material.

Figure 4:
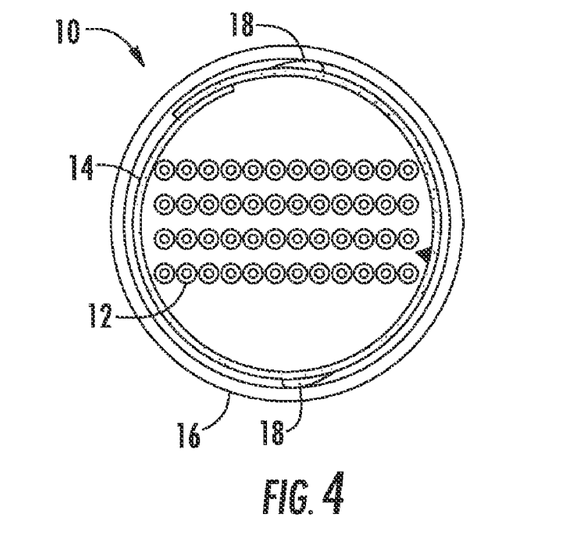
FIG. 4 is a sectional view of an embodiment of a third aspect of the cables.

In this regard, according to an embodiment of a third aspect of the cables, illustrated in FIG. 4, there is provided a buffer tube arrangement 10 in which a curable adhesive material 18 is provided for bonding a water-swellable element 14 to a buffer tube 16, but adhesive material 20 for bonding optical fibers 12 to the water-swellable material 14 is not included.

This third aspect of the cables relies on frictional coupling of the optical fibers (e.g., the fiber bundle) to the water-swellable element in order to couple the optical fibers to the buffer tube wall.

Figure 5:
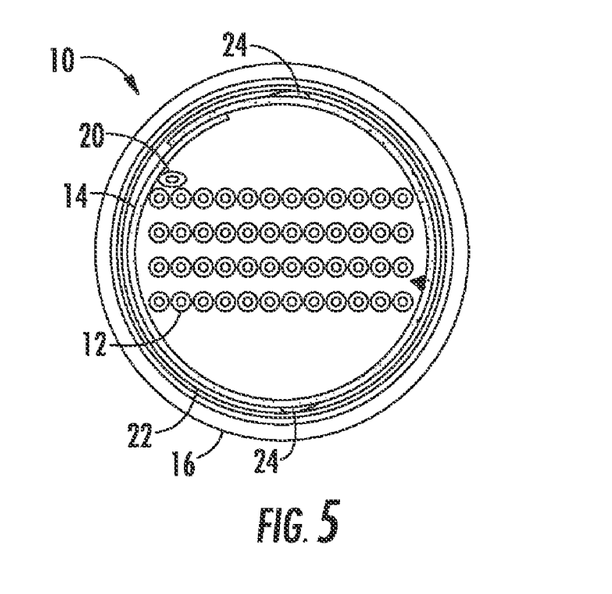
FIG. 5 is a sectional view of an embodiment of a fourth aspect of the cables.

FIG. 5 illustrates an embodiment of yet another aspect (i.e., a fourth aspect) of the cables. According to the fourth aspect, the buffer tube arrangement 10 includes a plurality of optical fibers 12 arranged in a bundle (e.g., a ribbon stack), a water-swellable element 14 disposed around the bundle of optical fibers 12, and a buffer tube 16 in which the optical fibers 12 and water-swellable element 14 are enclosed.

As in the first aspect illustrated in FIG. 1, an adhesive material 20 may be used for bonding the bundle of optical fibers to the water-swellable element 14. Although FIG. 5 illustrates the optical fibers bundled together as a ribbon stack, the optical fibers may be loosely disposed or helically wound around each other.

The fourth aspect differs from previous aspects in that a fibrous material 22 is provided between the water-swellable element 14 and the buffer tube 16. For example, a web of fibrous material 22 may be helically wrapped around the water-swellable element containing the optical fibers. An advantage of this aspect is that the water-swellable element may comprise a material of like composition with the buffer tube material. The water-swellable element may include, for example, polypropylene spun-bonded webs capturing water-swellable powder between two layers. A polyester spun-bonded web interposed between such a water-swellable element and a polypropylene buffer tube prevents the water-swellable element from developing an undesirably high level of bonding with the buffer tube. Again, this arrangement may allow the fiber bundle and water-swellable element to be placed under strain during the buffer-tube-extrusion process; the web of fibrous material allows slip between the water-swellable element and the buffer tube during this dynamic process. There may be at least two advantages to utilizing a water-swellable element comprising two layers of web capturing water-swellable powder between. First, the water-swellable particles may be kept away from the optical fibers, reducing the microbending induced by the particles impinging on the optical fibers. Second, little or no loose powder may be encountered when a cable containing such a two-layer water-swellable tape is accessed.

The buffer tube arrangement according to the fourth aspect includes a curable adhesive material 24 for bonding the fibrous material 22 to the water-swellable element 14. Curable adhesive material 24 may be any of the adhesive materials identified before in connection with curable adhesive material 18 of FIGS. 1, 2, and 4. Curable adhesive 24 may be applied, for example, on the surface of fibrous material 22 between water-swellable element 14 and fibrous material 22 prior to entering the buffer tube extruder, on the surface of water-swellable element 14 between water-swellable element 14 and fibrous material 22 prior to entering the buffer tube extruder, or curable adhesive material 24 may be embedded into water-swellable element 14 and/or fibrous material 22 prior to entering the buffer tube extruder. Curable adhesive material 24 may be applied as a bead or in any of the manners identified before in connection with curable adhesive material 18 of FIGS. 1, 2, and 4.

Fibrous material 22 may be, for example, a fibrous synthetic resin, such as a spun-bonded web or fabric. Fibrous material 22 may include spin-and-calender fibers that have been randomly oriented, pressed flat, and bonded with heat, thereby remaining porous and of a fibrous nature.

The composition of fibrous material 22 is not particularly limited and may include, for example, a polyester. In addition, the compositions of buffer tube 16 and fibrous material 22 may be chosen to promote adhesion through coupling of fibrous material 22 to a wall of buffer tube 16 through the mechanical interlocking of fibers from fibrous material 22 embedding into the wall of buffer tube 16 during the extrusion process of the buffer tube 16.

In particular, during the process of extruding the buffer tube, the fibers of the fibrous material 22 may become embedded in the buffer tube 16 so as to mechanically couple the two. During the buffer-tube-extrusion process, the fibrous material 22 is not bonded to the water-swellable element 14 because adhesive material 24 has yet to be cured. This yields the following advantages.

By using a curable adhesive material 24, which is not yet cured, and thus does not bond fibrous material 22 to water-swellable element 14 during the buffer-tube-extrusion process, relative movement is permitted between the buffer tube and the optical fibers. Thus, the optical fibers will not be subjected to undesirable compressive strain during cooling of the buffer tube. That is, (i) the optical fibers and water-swellable element will sufficiently remain together (e.g., remain together in sync, moving at the same rate) during the extrusion process, and (ii) the optical fibers and water-swellable element will move relative to the fibrous material and buffer tube due to the mechanical coupling (e.g., embedding) between the fibrous material and the wall of the buffer tube.

In addition, if a thermoplastic adhesive material 20 is used for bonding optical fibers 12 to the water-swellable element 14, the use of a curable adhesive material 24, which is not yet cured, and thus does not bond fibrous material 22 to water-swellable element 14 during the buffer-tube-extrusion process, will minimize or prevent unwanted shearing of thermoplastic adhesive material 20. In this regard, the use of a curable adhesive material 24, which is not yet cured, and thus does not bond fibrous material 22 to water-swellable element 14 during the buffer-tube-extrusion process, keeps the optical fibers and water-swellable element sufficiently together (e.g., together in sync, moving at the same rate) during the extrusion process. If it were otherwise, and the optical fibers and water-swellable element were permitted to move relative to one another, any adhesive between them, such as adhesive material 20, may be sheared and/or agglomerated into lumps that are undesirable in close proximity to the optical fibers.

According to the fourth aspect of the cables, curing of adhesive material 24 may be designed to take place downstream (e.g., after the buffer tube has cooled to a predetermined degree). Once cured to the predetermined degree, fibrous material 22 will be bonded to the water-swellable element 14, and water-swellable element 14 will thereby be adhered/coupled to buffer tube 16.

Figure 6:
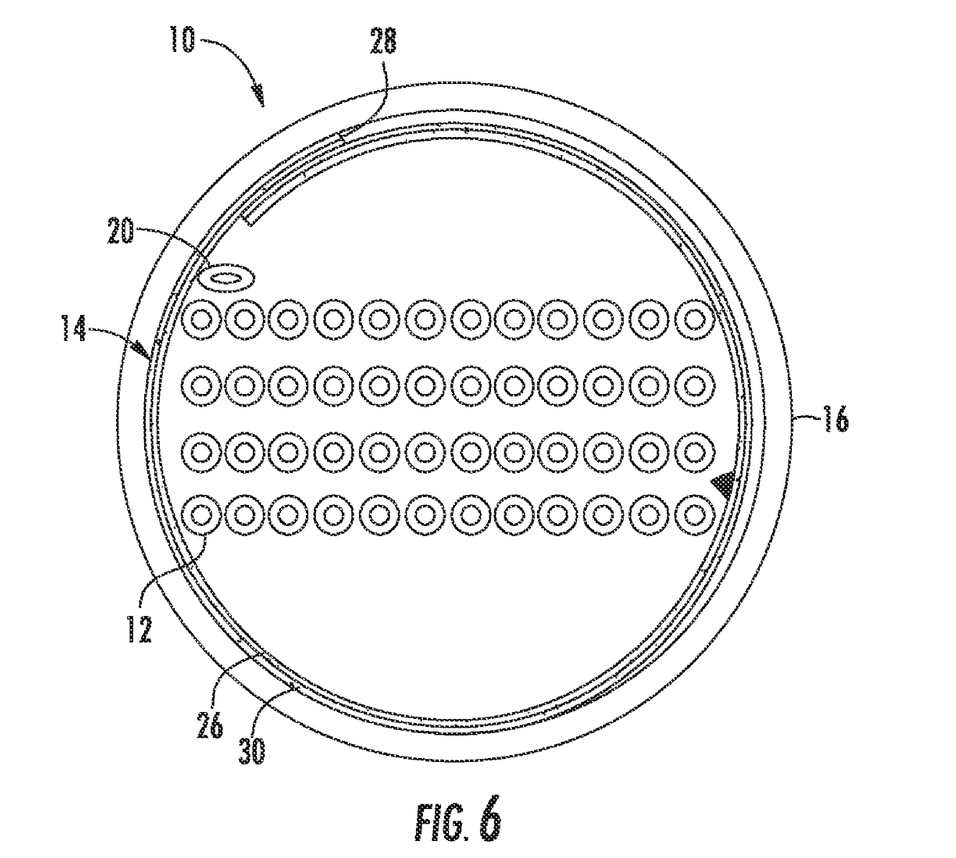
FIG. 6 is a sectional view of an embodiment of a fifth aspect of the cables.

According to an embodiment of a fifth aspect of the cables, illustrated in FIG. 6, a buffer tube arrangement 10 includes a plurality of optical fibers 12, a water-swellable element 14 disposed around the optical fibers 12, and a buffer tube 16 in which the optical fibers 12 and water-swellable element 14 are enclosed.

An adhesive material for bonding the optical fibers 12 to the water-swellable element 14 may be optionally included. The adhesive material may be any of the adhesive materials previously identified in connection with adhesive material 20 of FIGS. 1, 3, and 5.

The fifth aspect differs from previous aspects in that the water-swellable element 14 necessarily includes more than one layer, wherein the composition of an inner layer 26 of the water-swellable element 14 includes a material compatible with a material forming the buffer tube 16. In this regard, a seam 28 of inner layer 26 remains exposed to buffer tube 16 after wrapping of the water-swellable element 14. Accordingly, adhesion between the buffer tube 16 and water-swellable element 14 may be enhanced by the compatibility of inner layer 26 and buffer tube 16. Preferably, the material of the water-swellable element inner layer 26 (and thus the material of seam 28) has a melt profile, (e.g., a melting point) that is substantially similar to that of the material forming the buffer tube 16.

As for outer layer 30 of the water-swellable element 14, it may comprise any of the materials previously identified in connection with fibrous material 22 of FIG. 5. The term "outer" as used in connection with the layers of the water-swellable element 14 relates to the layer of the water-swellable element 14 closest to the buffer tube 16.

As an example, in one embodiment (not illustrated), a cable according to the fifth aspect may include a water-swellable element containing two polypropylene inner layers, having water-swellable powder sandwiched between the two inner layers, and a fibrous polyester resin as a third (outer) layer. The buffer tube may also be made of a material containing polypropylene.

A seam of the polypropylene inner layer(s) remains exposed after wrapping of the water-swellable element.

Therefore, upon entering the buffer-tube-extrusion process, the seam will be exposed to the buffer tube being extruded on (i.e., around) the water-swellable element.

Accordingly, in addition to the slight amount of adhesion achieved through mechanical coupling between the buffer tube and water-swellable element, which occurs due to fibrils of the water-swellable element's polyester-containing layer (the outer layer) becoming embedded in the inner wall of the buffer tube during cooling of the buffer tube, the seam provides enhanced adhesion between the water-swellable element and the buffer tube through bonding. In the example using a water-swellable element having polypropylene inner layers and a polypropylene-containing buffer tube, the seam of polypropylene from the inner layer(s) may melt into the inside wall of the buffer tube during the buffer-tube-extrusion process to provide a firm bond upon cooling. Polyester has a higher melting point than polypropylene, such that the polyester-containing outer layer of the water-swellable element may not participate in this kind of bonding.

In effect, the seam from the inner layer(s) of the water-swellable element may function as an alternative to curable adhesive materials 18 and 24 employed in the previously described aspects of the cables. However, in certain embodiments, cables according to the fifth aspect may also employ a curable adhesive material for further bonding of the water-swellable element to the buffer tube. The curable adhesive may be any of the curable adhesive materials previously identified in connection with curable adhesive material 18 of FIGS. 1, 2, and 4 and curable adhesive 24 of FIG. 5.

In the specification and figures, typical embodiments of the invention have been disclosed. The present invention is not limited to such exemplary embodiments. Departures can be made from aspects and embodiments of the cables described herein by those of ordinary skill in the art without departing from the spirit and scope of the invention. Unless otherwise noted, specific terms have been used in a generic and descriptive sense and not for purposes of limitation.

The invention claimed is:

1. An optical-fiber cable, comprising:
   a plurality of optical fibers;
   a water-swellable element substantially enclosing said optical fibers; and
   an adhesive material adhesively coupling said water-swellable element to said optical fibers without requiring frictional coupling.

2. The optical-fiber cable of claim 1, wherein said adhesive material is embedded in said water-swellable element.

3. The optical-fiber cable of claim 1, wherein said adhesive material is provided as at least one bead.

4. The optical-fiber cable of claim 1, wherein said adhesive material comprises a plurality of intermittent beads of adhesive material.

5. The optical-fiber cable of claim 1, wherein said adhesive material comprises a plurality of discrete domains of adhesive material.

6. The optical-fiber cable of claim 1, wherein said adhesive material comprises a curable adhesive material.

7. The optical-fiber cable of claim 6, wherein said curable adhesive material has been cured, and said cured adhesive material bonds said water-swellable element to said optical fibers.

8. The optical-fiber cable of claim 1, wherein said adhesive material comprises a thermally curable material.

9. The optical-fiber cable of claim 8, wherein said adhesive material comprises a silicone.

10. The optical-fiber cable of claim 1, wherein said adhesive material comprises a radiation-curable material.

11. The optical-fiber cable of claim 1, wherein said adhesive material comprises a hot melt adhesive.

12. The optical-fiber cable of claim 1, wherein said adhesive material comprises a foamed adhesive material.

13. The optical-fiber cable of claim 1, wherein said optical fibers comprise a ribbon stack.

14. The optical-fiber cable of claim 1, wherein said optical fibers comprise loosely disposed or helically wound optical fibers.

15. The optical-fiber cable of claim 1, wherein said water-swellable element comprises water-absorbing tape and/or water-absorbing yarn.

16. The optical-fiber cable of claim 1, wherein said water-swellable element comprises a water-swellable powder sandwiched between two layers.

17. The optical-fiber cable of claim 1, wherein said water-swellable element is substantially free of superabsorbent particulate powders.

18. An optical-fiber cable, comprising:
   a plurality of optical fibers;
   a water-swellable element substantially enclosing said optical fibers; and
   an adhesive material adhesively bonding said water-swellable element and said optical fibers, wherein said adhesive material resists movement of said optical fibers relative to said water-swellable element without requiring the application of an external compressive force upon said water-swellable element.

19. The optical-fiber cable of claim 18, wherein said adhesive material provides the predominant coupling force between said water-swellable element and said optical fibers.

20. The optical-fiber cable of claim 18, wherein said adhesive material is embedded in said water-swellable element.

21. The optical-fiber cable of claim 18, wherein the optical-fiber cable is essentially free of thixotropic filling gel.

* * * * *